United States Patent [19]
Lee

[11] Patent Number: 6,058,458
[45] Date of Patent: May 2, 2000

[54] MULTI-PROCESSOR SYSTEM HAVING A SHARED PROGRAM MEMORY AND RELATED METHOD

[75] Inventor: Jeong-min Lee, Seoul, Rep. of Korea

[73] Assignee: SamSung Electronics Co., Ltd., Kyungki-do, Rep. of Korea

[21] Appl. No.: 08/985,184

[22] Filed: Dec. 4, 1997

[30] Foreign Application Priority Data

Dec. 5, 1996 [KR] Rep. of Korea ...................... 96-62129

[51] Int. Cl.[7] .................................................. G06F 13/16
[52] U.S. Cl. ......................... 711/148; 711/153; 709/214; 709/215; 709/222
[58] Field of Search .................................... 711/147, 148, 711/156, 153, 173, 202; 709/214, 215, 222

[56] References Cited

U.S. PATENT DOCUMENTS

| | | | |
|---|---|---|---|
| 4,674,033 | 6/1987 | Miller | 711/151 |
| 5,289,585 | 2/1994 | Kock et al. | 711/113 |
| 5,289,588 | 2/1994 | Song et al. | 711/120 |
| 5,297,265 | 3/1994 | Frank et al. | 711/202 |
| 5,440,698 | 8/1995 | Sindhu et al. | 709/225 |
| 5,448,716 | 9/1995 | Hardell, Jr. et al. | 709/400 |
| 5,469,549 | 11/1995 | Simpson et al. | 709/213 |
| 5,579,504 | 11/1996 | Callander et al. | 711/114 |
| 5,581,734 | 12/1996 | DiBrino et al. | 711/169 |
| 5,634,037 | 5/1997 | Sasaki et al. | 711/152 |
| 5,655,102 | 8/1997 | Galles | 711/150 |
| 5,694,538 | 12/1997 | Okazaki et al. | 714/15 |

Primary Examiner—Hiep T Nguyen
Attorney, Agent, or Firm—Robert E. Bushnell, Esq.

[57] ABSTRACT

A multi-processor system having a shared program memory includes: a plurality of processors; a plurality of local memories which are respectively dedicated to the processors; a global memory which can be accessed by all of the processors; a program memory for storing a program which may be read and executed by each of the processors; a system bus for transferring data between the processors and the global memory, or between the processors and the program memory; and a memory switch for connecting the system bus to the program memory after a system reset, and to the global memory after allocating an identification number of each of the processors. Accordingly, it is easy to implement a multi-processor system in a restricted space area (for example, in a VME system).

29 Claims, 4 Drawing Sheets

MULTI-PROCESSOR SYSTEM HAVING A SHARED PROGRAM MEMORY AND RELATED METHOD

CLAIM OF PRIORITY

This application makes reference to, incorporates the same herein, and claims all benefits accruing under 35 U.S.C. §119 from an application for MULTI-PROCESSOR SYSTEM HAVING A SHARED PROGRAM MEMORY earlier filed in the Korean Industrial Property Office on the $5^{th}$ of December 1996 and there duly assigned Ser. No. 62129/1996.

BACKGROUND OF THE INVENTION

1. Technical Field

The present invention relates to a multi-processor system and method and, more particularly, to a multi-processor system having a shared program memory and a related method for allocating identification numbers to the processors in such a system.

2. Related Art

A multi-processor system is generally used for parallel processing. In the multi-processor system, a plurality of processors may perform the same task or different tasks.

Recent designs suggested in the art are exemplified by U.S. Pat. No. 5,655,102 to Galles, entitled System And Method For Piggybacking Of Read Responses On A Shared Memory Multiprocessor Bus, U.S. Pat. No. 5,634,037 to Sasaki et al., entitled Multiprocessor System Having A Shared Memory With Exclusive Access For A Requesting Processor Which Is Maintained Until Normal Completion Of A Process And For Retrying The Process When Not Normally Completed, U.S. Pat. No. 5,581,734 to DiBrino et al., entitled Multiprocessor System With Shared Cache And Data Input/Output Circuitry For Transferring Data Amount Greater Than System Bus Capacity, U.S. Pat. No. 5,579,504 to Callander et al., entitled Multi-Processors Computer System Having Shared Memory, Private Cache Memories, And Invalidate Queues Having Valid Bits And Flush Bits For Serializing Transactions, U.S. Pat. No. 5,469,549 to Simpson et al., entitled Computer System Having Multiple Asynchronous Processors Interconnected By Shared Memories And Providing Fully Asynchronous Communication Therebetween, U.S. Pat. No. 5,448,716 to Hardell Jr., et al., entitled Apparatus And Method For Booting A Multiple Processor System Having A Global/Local Memory Architecture, U.S. Pat. No. 5,440,698 to Sindhu et al., entitled Arbitration Of Packet Switched Busses, Including Busses For Shared Memory Multiprocessors, U.S. Pat. No. 5,297,265 to Frank et al., entitled Shared Memory Multiprocessor System And Method Of Operation Thereof, U.S. Pat. No. 5,289,588 to Song et al., entitled Interlock Acquisition For Critical Code Section Execution In A Shared Memory Common-Bus Individually Cached Multiprocessor System, U.S. Pat. No. 5,289,585 to Kock et al., entitled Multiprocessor System Having A System Bus For The Coupling Of Several Processing Units With Appertaining Private Cache Memories And A Common Main Memory, and U.S. Pat. No. 4,674,033 to Miller, entitled Multiprocessor System Having A Shared Memory For Enhanced Interprocessor Communication.

As explained in more detail below, in such a multi-processor system, the individual processors are directly connected to both local memories and program memories, but are commonly connected to a global memory through a system bus.

This leads to a disadvantage and inefficiency in such a multi-processor system in that, due to the fact that dedicated local memories and program memories are provided for each processor, there is a waste of installation space and inefficiency in cost. This is particularly burdensome in certain cases, such as in a case of a VME system, in which a plurality of processors, local memories and program memories are necessarily installed in a small, restricted space (for example, in the space of a VME board). As also explained below, auxiliary boards can be used to solve this problem but such a technique does not have sufficient reliability to meet certain strict standards (such as the miliary standard specification).

SUMMARY OF THE INVENTION

One object of the present invention is to provide a multi-processor system having a shared program memory in which space occupied by devices composing the multi-processor system is reduced.

Another object of the present invention is to provide a method for allocating an identification number to each processor in a multi-processor system.

To achieve one of the objects above, there is provided a multi-processor system with a plurality of processors; a plurality of local memories which are respectively dedicated to the processors; a global memory which can be accessed by all of the processors; a program memory for storing a program which may be read and executed by each of the processors; a system bus for transferring data between the processors and the global memory, or between the processors and the program memory; and a memory switch for connecting the system bus (and the processors connected to the bus) to the program memory after a system reset, and to the global memory after allocating an identification number to each to the processors.

To achieve another one of the objects above, there is provided a method for allocating identification numbers to a plurality of processors in a multi-processor system having a plurality of processors; a local memory dedicated to each of the processors; a global memory shared by the processors; a program memory shared by the processors; and a memory switch for selectively connecting the global memory or the program memory to the processors, each of the processors having an input communication port and an output communication port for connecting the processors to one another in a ring pattern, and a reference voltage port connected to one of a first voltage and a second voltage. The method comprises the steps of: checking the voltage level of the reference voltage port of the processors, and allocating the identification number of "1" to a processor if the voltage level thereof is a first voltage level, and allocating a value input to the input communication port thereof as an identification number if the voltage level thereof is a second voltage level; incrementing the identification number of each processor by one, and transmitting the incremented value to the next processor through the output communication port; and determining that the identification numbers are completely allocated for all of the processors when a processor having the identification number of "1" receives a number equal to the number of the processors plus one through an input communication port thereof.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
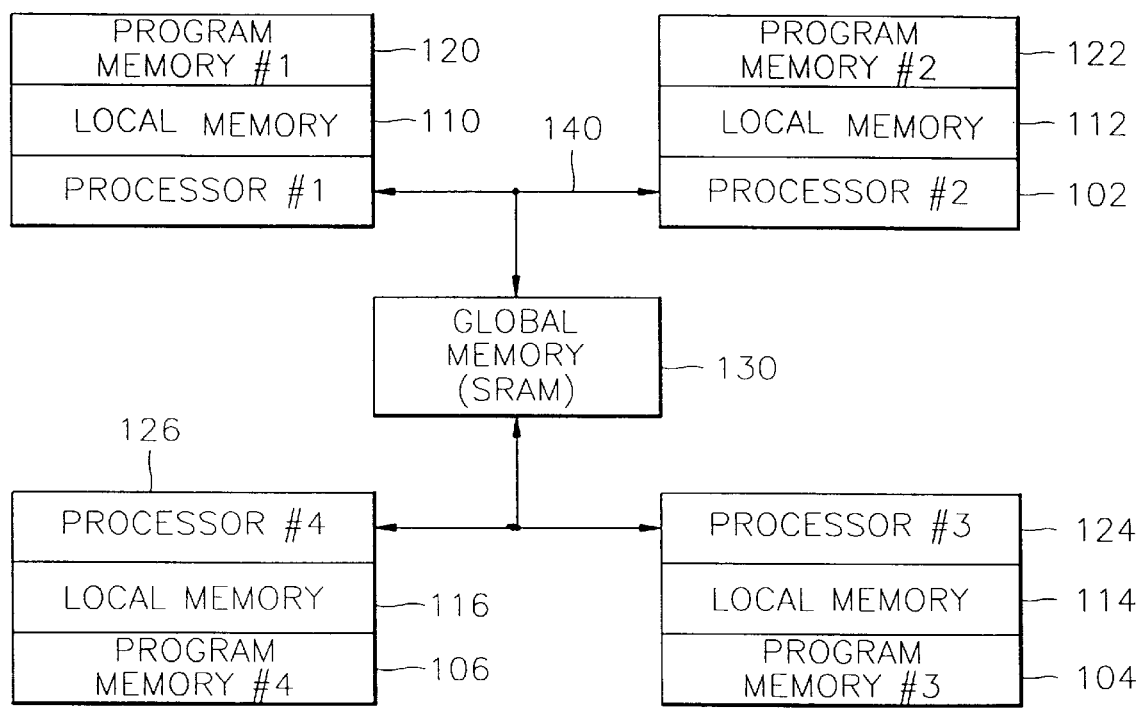
FIG. 1 is a block diagram of a multi-processor system.

FIG. 1 is a block diagram of a multi-processor system which has processors 100, 102, 104 and 106. The processors 100, 102, 104 and 106 are directly connected to local memories 110, 112, 114 and 116, respectively, and to program memories 120, 122, 124 and 126, respectively, and are allowed to access a global memory 130 through a system bus 140.

The local memories 110, 112, 114 and 116 can be accessed by only the respective processors. Also, the program memories 120, 122, 124 and 126 are used to store system programs required for the respective processors to perform their tasks, and to store user programs prescribing the tasks. Meanwhile, the global memory 130 is used for the exchange or sharing of data among the processors 100, 102, 104 and 106. Generally, the local memories 110, 112, 114 and 116 and the global memory 130 are composed of a static random access memory (SRAM), while the program memories 120, 122, 124 and 126 are composed of an erasable programmable ROM (EPROM) or a flash memory.

The multi-processor system shown in FIG. 1 is characterized by inefficiency in that the installation space of the system is wasted, and the cost thereof is high since separate local memories 110, 112, 114 and 116 and separate program memories 120, 122, 124 and 126 are included for each processor. Particularly, in the case of a VME system, which has four processors (for example), four local memories and four program memories can be installed in the restricted space of a VME board. In such a case, an SMD or an auxiliary board can be used in order to solve the space problem. However, such methods do not guarantee sufficient reliability under severe circumstances, such as those required by the military standard specification.

Figure 2:
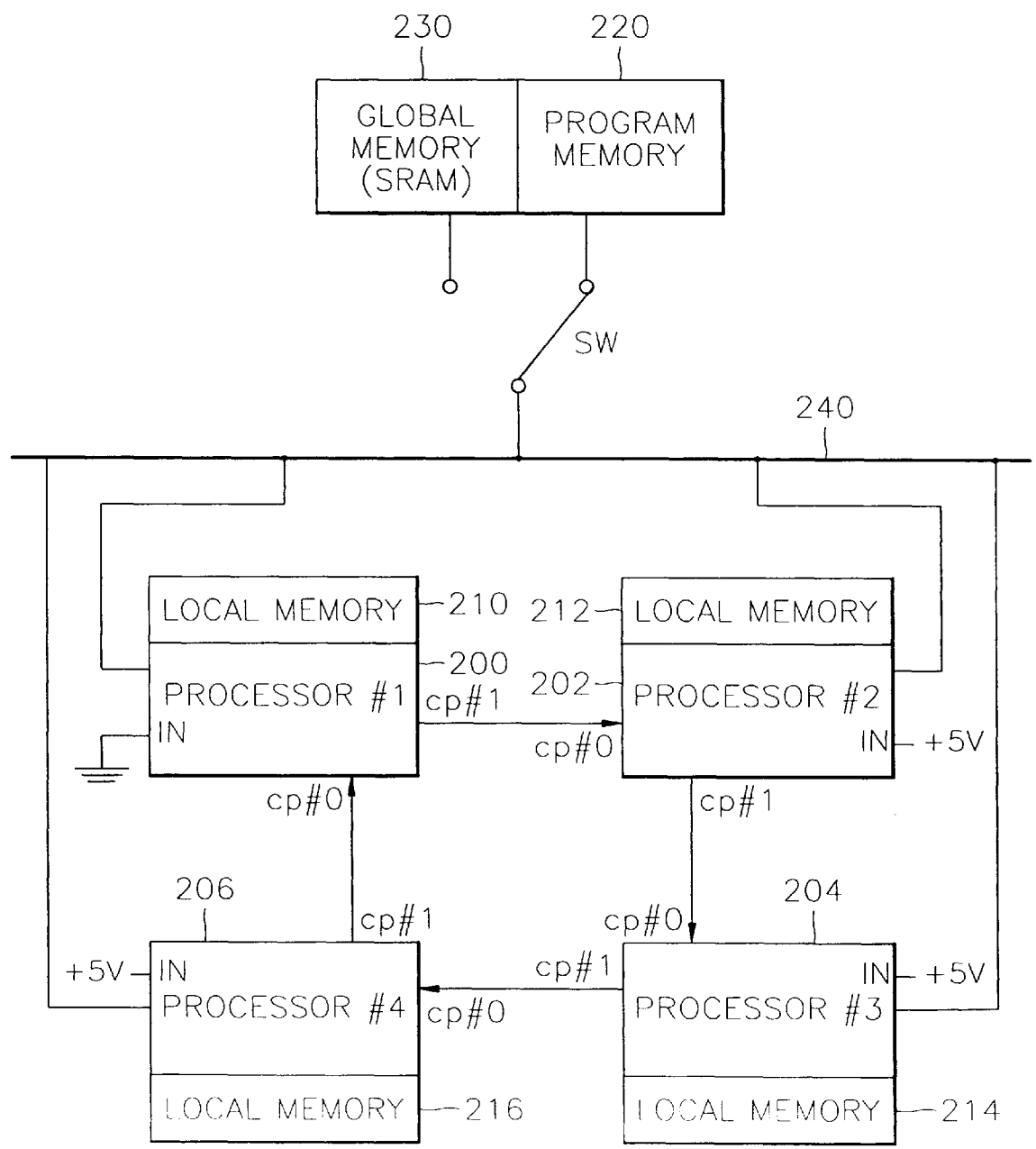
FIG. 2 is a block diagram of an embodiment of a multi-processor system according to the present invention.

Referring to FIG. 2, the multi-processor system includes four processors 200, 202, 204 and 206, four local memories 210, 212, 214 and 216, a program memory 220, a global memory 230, a system bus 240 and a memory switch SW. Also, each of the processors has an input communication port CP#0, output communication port CP#1, and a reference voltage port IN. The local memories 210, 212, 214 and 216, which correspond to the local memories 110, 112, 114 and 116 of FIG. 1, are dedicated to the processors 200, 202, 204 and 206, respectively, so that they may be accessed by only those respective processors. The program memory 220, which corresponds to the program memories 120, 122, 124 and 126 of FIG. 1, stores a program prescribing the tasks to be executed, and can be accessed by any one of the processors. The global memory 230, which corresponds to the global memory 130 of FIG. 1, can be accessed by each of the processors 200, 202, 204 and 206.

The processors 200, 202, 204 and 206 access the global memory 230 or the program memory 220 through the system bus 240. The system bus 240 is connected to the program memory 220 by the memory switch SW after a system reset, but to the global memory 230 after the identification number of each processor is allocated. In other words, after the system power is turned on or the system is reset, the processors 200, 202, 204 and 206 load the same booting program stored in the program memory 220 and execute such program. Then, a process for determining the identification number of each processor of the multi-processor system is performed, so that the programs for each particular processor are discriminated and loaded therein.

In the present embodiment, the multi-processor system includes the input communication port CP#0, the output communication port CP#1, and the reference voltage port IN so that the identification number of each processor is determined by use of those ports. The output communication port CP#1 of a processor having a predetermined identification number is connected to the input communication port CP#0 of a processor having the next identification number, so that all of the processors are connected to one another in a ring pattern. The reference voltage port IN of one processor among the four processors is grounded, while the ports of the other processors are provided with a predetermined voltage level which is 5V in this embodiment.

Figure 3:
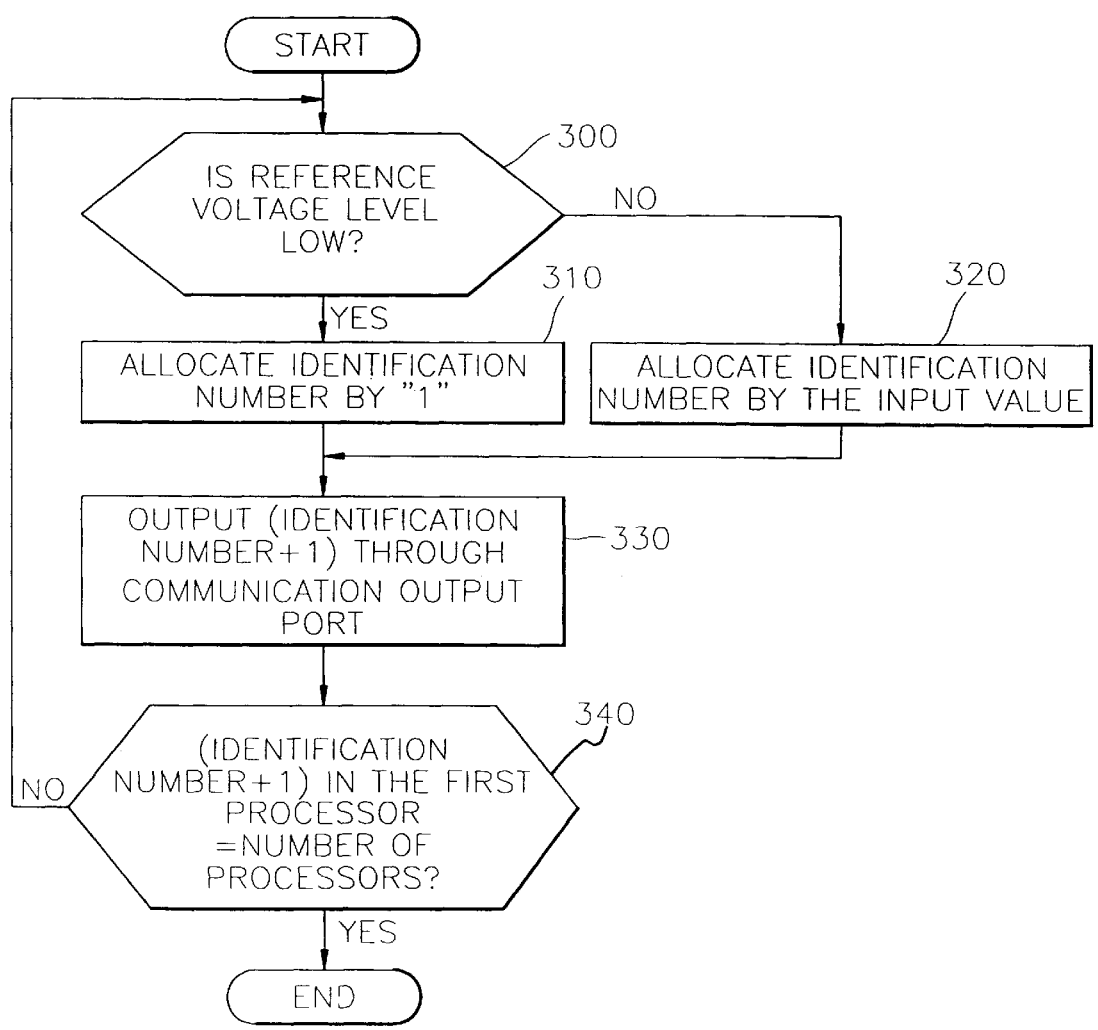
FIG. 3 is a flow chart outlining the procedure for allocating an identification number to each processor in the multi-processor system of FIG. 2.

FIG. 3 is a flow chart outlining the procedure for allocating the identification numbers to each processor of the multi-processor system according to the present invention, as shown in FIG. 2.

First, after the system power is turned on or the system is reset, each processor 200, 202, 204 or 206 loads a booting program stored in program memory 220 and executes such program. Then, each processor 200, 202, 204 or 206 checks the signal input to its reference voltage port IN (step 300). Each processor sets "1" as the identification number thereof if the signal level is low (step 310), while each processor sets the value at the input communication port CP#0 thereof as its identification number if the signal level of the reference voltage port thereof is high (step 320).

Subsequently, each processor 200, 202, 204 and 206, in turn, increments its identification number by one, and outputs the incremented identification number through its output communication port CP#1 (step 330). That is, processor 200 increments its identification number by one, and outputs the incremented identification number through its output communication port CP#1 to processor 202. The next processor 202 in the ring determines the value at its input communication port CP#0, adopts that value as its identification number, and then increments the identification number by one and transmits the new value to the next processor through its output communication port CP#1. The latter process is carried out two more times for processors 204 and 206.

Then, the processor 200 having the identification number of "1" confirms that all processors have received their identification numbers; that is, processor 200 takes the value at its input communication port CP#0, and checks to see that it equals the number of processors in the system plus one (step 340). Namely, in the multi-processor system according to FIG. 2, processor 200 determines that the identification numbers are allocated for all processors when processor 200 receives a value of 5 at its input communication port CP#0.

Afterwards, the booting program of the first processor 200 switches from the program memory 220 to the global memory (SRAM) 230 using the memory switch SW, and initializes the system. Then, the processors 200, 202, 204 and 206 have access to the global memory 230.

Figure 4:
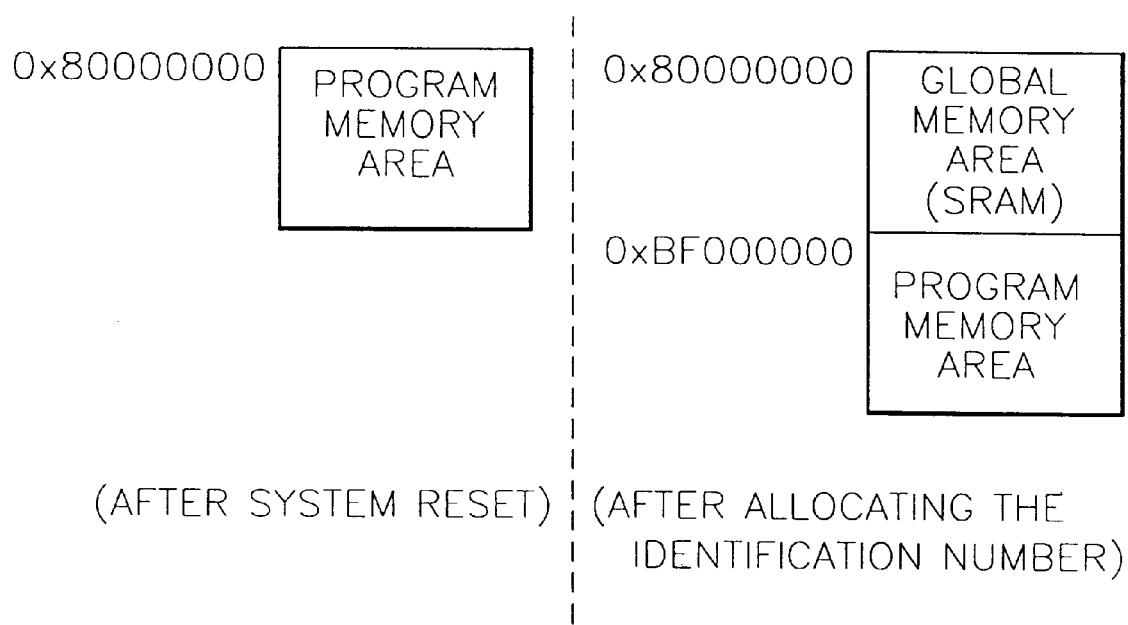
FIG. 4 shows an example of the contents of a global memory map prior to and after the allocation of the processor identification numbers in the present invention.

FIG. 4 shows an example of the contents of a global memory map prior to and after the allocation of the processor identification numbers according to the present invention. Before the identification numbers of the processors are allocated after system reset, addresses (0x80000000–0xffffffff) are allocated for program memory 220. However, after the identification numbers of the processors are allocated, addresses (0x00000000–0x7fffffff) are allocated for the global memory (SRAM) 230, and addresses (0xbf000000–0xffffffff) are allocated for the program memory 220.

As a result of the present invention, it is easy to implement a multi-processor system in a restricted space (for example, in a VME system), since all the processors share a single or common program memory.

What is claimed is:

1. A multi-processor system, comprising:
    a plurality of processors;
    a plurality of local memories, one for each processor, respectively dedicated to said processors;
    a global memory which can be accessed by all of said processors;
    program memory means for storing at least one program which may be read and executed by each of said processors;
    system bus means connected to each of said processors for transferring data to and from said processors; and
    memory switch means connected between said system bus means, on the one hand, and said global memory and said program memory means, on the other hand, and responsive to a system reset for connecting said system bus means to said program memory means, and responsive to allocation of an identification number to each respective one of said processors for connecting said system bus means to said global memory.

2. The multi-processor system as claimed in claim 1, wherein each of said processors comprises:
    an input communication port for receiving the identification number thereof; and
    an output communication port for outputting a value of the identification number thereof incremented by one;
    wherein said output communication port of each of said processors is connected to said input communication port of a next succeeding one of said processors so that said processors are connected to one another in a ring pattern.

3. The multi-processor system as claimed in claim 2, wherein each of said processors includes a reference voltage port, and wherein said reference voltage port of one of said processors is provided with a first voltage level while said reference voltage ports of others of said processors are each provided with a second voltage level.

4. The multi-processor system as claimed in claim 3, wherein each of said processors checks a signal input to its reference voltage port, and wherein each of said processors sets an identification number thereof to a given value if the signal input to its reference voltage port is low, and sets its identification number equal to a value at its input communication port if the signal input at its reference voltage port is high.

5. The multi-processor system as claimed in claim 4, wherein each of said processors, in sequence, increments its identification number by a value of one and outputs the incremented identification number through its output communication port to a next processor in sequence.

6. A method for allocating identification numbers to a plurality of processors in a multi-processor system which includes said plurality of processors, a local memory dedicated to each of said processors, a global memory shared by said processors, a program memory shared by said processors, and a memory switch for connecting a selected one of the global memory and the program memory to said processors, each of said processors having an input communication port and an output communication port for connecting said processors to one another in a ring pattern, and having a reference voltage port connected to one of a first voltage and a second voltage; said method comprising the steps of:
    checking a voltage level at the reference voltage port of each of said processors, and allocating an identification number of said each of said processors as "1" if the voltage level thereof equals the first voltage level, and allocating the identification number of said each of said processors as the value input to the input communication port thereof if the voltage level thereof equals the second voltage level;
    incrementing the identification number of said each of said processors by one;
    transmitting the incremented identification number of said each of said processors to a next processor in sequence through the output communication port of said each of said processors; and
    determining that the identification numbers are completely allocated for all of said processors when a processor having the identification number of "1" receives, at said input communication port thereof, an incremented value equal to a number of the processors plus one.

7. A multi-processor system comprising:
    a plurality of processors, each of said processors including an input communication port for receiving an identification number thereof, an output communication port for outputting a value of the identification number thereof, and a reference voltage port;
    a plurality of local memories, one for each processor, respectively dedicated to said processors;
    a global memory accessible by each of said processors;
    system bus means connected to each of said processors for transferring data to and from said processors; and
    memory switch means connected between said system bus means and said global memory;
    wherein each of said processors checks a signal input at its reference voltage port, and wherein each of said processors sets an identification number thereof to a given value if a signal input at its reference voltage port is low, and each of said processors sets its identification number to a value of the signal input at its input communication port if the signal level at its reference voltage port is high.

8. The multi-processor system as claimed in claim 7, wherein each of said processors, in sequence, increments its identification number by one, and outputs the incremented identification number through its output communication port to a next processor in sequence.

9. A multi-processor system, comprising:
    a plurality of processors;
    a global memory which can be accessed by each of said processors;
    program memory means for storing at least one program which may be read and executed by each of said processors;

system bus means connected to each of said processors for transferring data to and from said processors; and memory switch means connected between said system bus means, on the one hand, and said global memory and said program memory means, on the other hand, and responsive to a system reset for connecting said system bus means to said program memory means, and responsive to allocation of an identification number to each respective one of said processors for connecting said system bus means to said global memory.

10. The multi-processor system as claimed in claim 9, wherein each of said processors comprises:

an input communication port for receiving the identification number thereof; and an output communication port for outputting a value of the identification number thereof incremented by one;

wherein said output communication port of each of said processors is connected to said input communication port of a next succeeding one of said processors so that said processors are connected to one another in a ring pattern.

11. The multi-processor system as claimed in claim 10, wherein each of said processors includes a reference voltage port, and wherein said reference voltage port of one of said processors is provided with a first voltage level while said reference voltage ports of others of said processors are each provided with a second voltage level.

12. The multi-processor system as claimed in claim 11, wherein each of said processors checks a signal input to its reference voltage port, and wherein each of said processors sets an identification number thereof to a given value if the signal input to its reference voltage port is low, and sets its identification number equal to a value at its input communication port if the signal input at its reference voltage port is high.

13. The multi-processor system as claimed in claim 12, wherein each of said processors, in sequence, increments its identification number by a value of one and outputs the incremented identification number through its output communication port to a next processor in sequence.

14. A method for allocating identification numbers to a plurality of processors in a multi-processor system which includes said plurality of processors, each of said processors having an input communication port and an output communication port for connecting said processors to one another, and having a reference voltage port connected to one of a first voltage and a second voltage; said method comprising the steps of:

checking a voltage level at the reference voltage port of each of said processors, and allocating an identification number of said each of said processors as "1" if the voltage level thereof equals the first voltage level, and allocating the identification number of said each of said processors as the value input to the input communication port thereof if the voltage level thereof equals the second voltage level;

incrementing the identification number of said each of said processors by one;

transmitting the incremented identification number of said each of said processors to a next processor in sequence through the output communication port of said each of said processors; and determining that the identification numbers are completely allocated for all of said processors when a processor having the identification number of "1" receives, at said input communication port thereof, an incremented value equal to a number of the processors plus one.

15. The method as claimed in claim 14, wherein said multi-processor system includes a local memory dedicated to each of said processors.

16. The method as claimed in claim 14, wherein said multi-processor system includes a global memory shared by said processors.

17. The method as claimed in claim 16, wherein said multi-processor system includes a program memory shared by said processors.

18. The method as claimed in claim 17, wherein said multi-processor system includes a memory switch for connecting a selected one of the global memory and the program memory to said processors.

19. The method as claimed in claim 14, wherein said input and output communication ports connect said processors in a ring pattern.

20. A multi-processor system comprising:

a plurality of processors, each of said processors including an input communication port for receiving an identification number thereof, an output communication port for outputting a value of the identification number thereof, and a reference voltage port; and system bus means connected to each of said processors for transferring data to and from said processors;

wherein each of said processors checks a signal input at its reference voltage port, and wherein each of said processors sets an identification number thereof to a given value if a signal input at its reference voltage port is low, and each of said processors sets its identification number to a value of the signal input at its input communication port if the signal level at its reference voltage port is high.

21. The multi-processor system as claimed in claim 20, wherein each of said processors, in sequence, increments its identification number by one, and outputs the incremented identification number through its output communication port to a next processor in sequence.

22. The multi-processor system as claimed in claim 20, further comprising a plurality of local memories, one for each processor, respectively dedicated to said processors.

23. The multi-processor system as claimed in claim 20, further comprising a global memory accessible by each of said processors;.

24. The multi-processor system as claimed in claim 23, further comprising a shared program memory accessible by each of said processors.

25. The multi-processor system as claimed in claim 24, further comprising memory switch means connected between said system bus means, on the one hand, and said global memory and said shared program memory, on the other hand, for selectively connecting each of said processors to one of said global memory and said shared memory.

26. A multi-processor system, comprising:

a plurality of processors; and system bus means connected to each of said processors for transferring data to and from said processors;

wherein each of said processors comprises an input communication port for receiving the identification number thereof, and an output communication port for outputting a value of the identification number thereof incremented by one; and wherein said output communication port of each of said processors is connected to said input communication port of a next succeeding one of said processors so that said processors are connected to one another in a ring pattern.

27. The multi-processor system as claimed in claim 26, wherein each of said processors includes a reference voltage port, and wherein said reference voltage port of one of said processors is provided with a first voltage level while said reference voltage ports of others of said processors are each provided with a second voltage level.

28. The multi-processor system as claimed in claim 27, wherein each of said processors checks a signal input to its reference voltage port, and wherein each of said processors sets an identification number thereof to a given value if the signal input to its reference voltage port is low, and sets its identification number equal to a value at its input communication port if the signal input at its reference voltage port is high.

29. The multi-processor system as claimed in claim 28, wherein each of said processors, in sequence, increments its identification number by a value of one and outputs the incremented identification number through its output communication port to a next processor in sequence.

* * * * *